United States Patent [19]

Ito et al.

[11] Patent Number: 4,527,283

[45] Date of Patent: Jul. 2, 1985

[54] CHARACTER INFORMATION SEPARATING APPARATUS FOR PRINTED CHARACTER READING SYSTEMS

[75] Inventors: Koji Ito, Kanagawa; Masanori Onishi, Chiba; Hisao Hayashi, Tokyo, all of Japan

[73] Assignee: Tokyo Keiki Company Limited, Tokyo, Japan

[21] Appl. No.: 558,911

[22] Filed: Dec. 7, 1983

Related U.S. Application Data

[63] Continuation-in-part of Ser. No. 236,600, Feb. 20, 1981, abandoned.

[30] Foreign Application Priority Data

Feb. 26, 1980 [JP] Japan ............................... 55-23133

[51] Int. Cl.$^3$ ............................................. G06K 9/34
[52] U.S. Cl. ............................................. 382/9; 382/48
[58] Field of Search ............................... 382/9, 45, 48

[56] References Cited

U.S. PATENT DOCUMENTS

| | | | |
|---|---|---|---|
| 3,506,807 | 4/1970 | Malaby | 382/45 |
| 3,587,047 | 6/1971 | Cutaia | 382/45 |
| 3,629,826 | 12/1971 | Cutaia et al. | 382/9 |
| 3,727,184 | 4/1973 | Roza et al. | 382/48 |
| 4,045,773 | 8/1977 | Kadota et al. | 382/9 |
| 4,251,799 | 2/1981 | Jih | 382/48 |
| 4,292,622 | 9/1981 | Henrichon | 382/9 |
| 4,377,803 | 3/1983 | Lotspiech et al. | 382/9 |

OTHER PUBLICATIONS

Baumgartner, "Iterative Segmentation" *IBM Tech. Disclosure Bulletin*, vol. 14, No. 9, Feb., 1972, pp. 2643-2644.

Bishop et al., "Character Rec. Approach Involving Histogram Classification" *IBM Tech. Disclosure Bulletin*, vol. 21, No. 9, Feb., 1979, pp. 3461-3467.

*Primary Examiner*—Leo H. Boudreau
*Attorney, Agent, or Firm*—Fleit, Jacobson, Cohn & Price

[57] ABSTRACT

An apparatus for a printed character reading system in which prior to the recognition process, the information obtained by reading the characters on a source document is separated line by line to obtain a line information and then, starting at its one end, the line information is successively separated character by character to obtain a character information for each of the individual characters. In this apparatus, the read character information is stored primarily character by character each for approximately one and a half line width and the 1.5-line information is then dissected in the line direction into blocks each having a line length of two character spacings. Then, a linewise projection information is produced for each of the blocks so that in accordance with the resulting projection information the intended line information is separated into blocks and then the character information for the respective characters are separated successively from the character information contained in each of the blocks.

6 Claims, 10 Drawing Figures

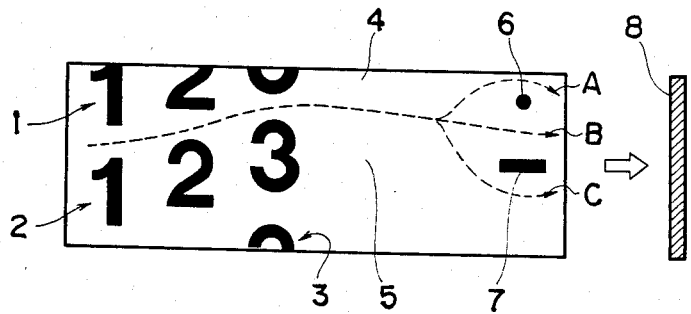
FIG. 1 PRIOR ART
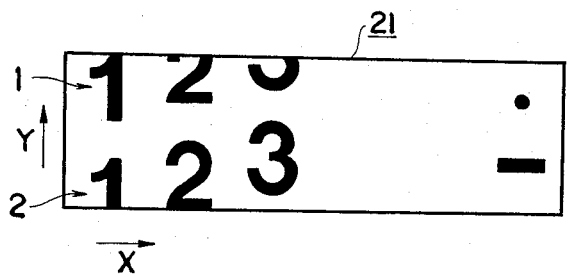
FIG. 3
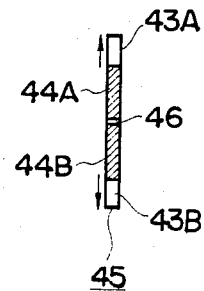
FIG. 5
FIG. 4
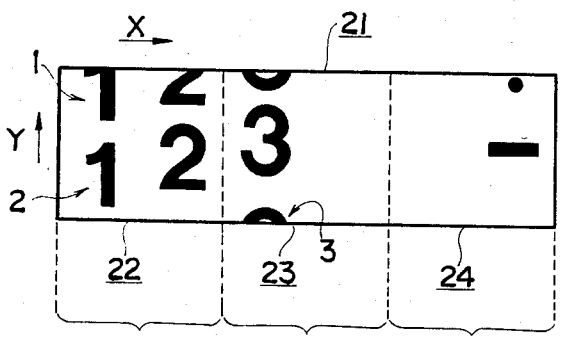
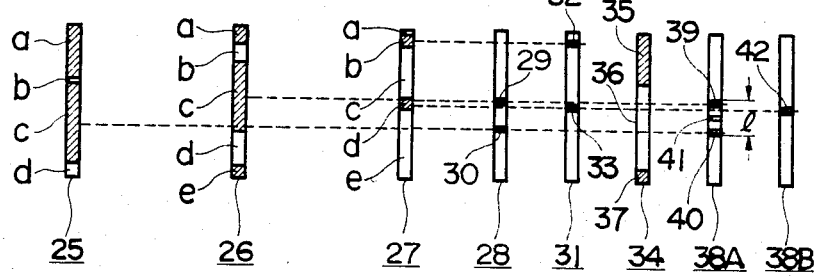

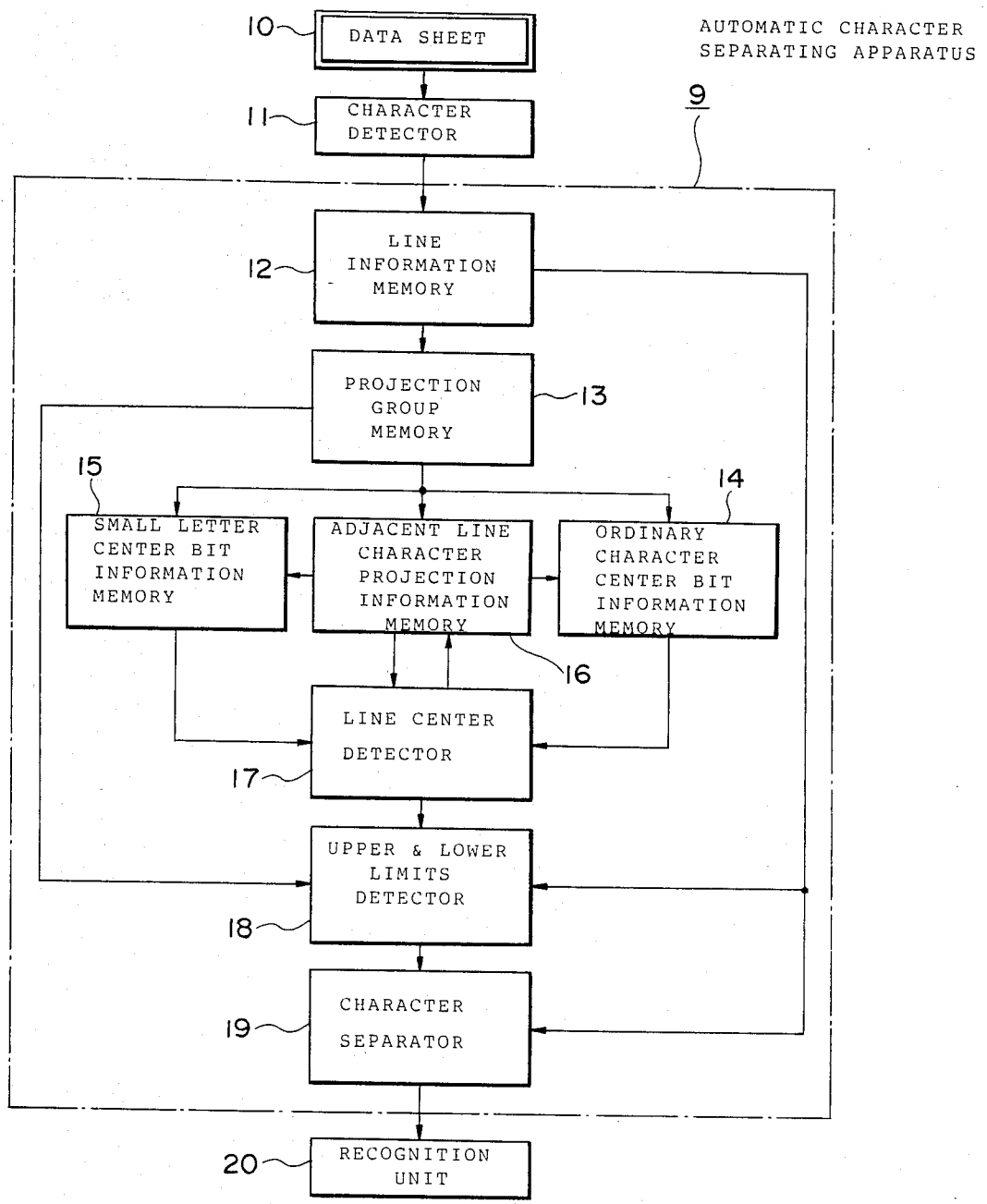

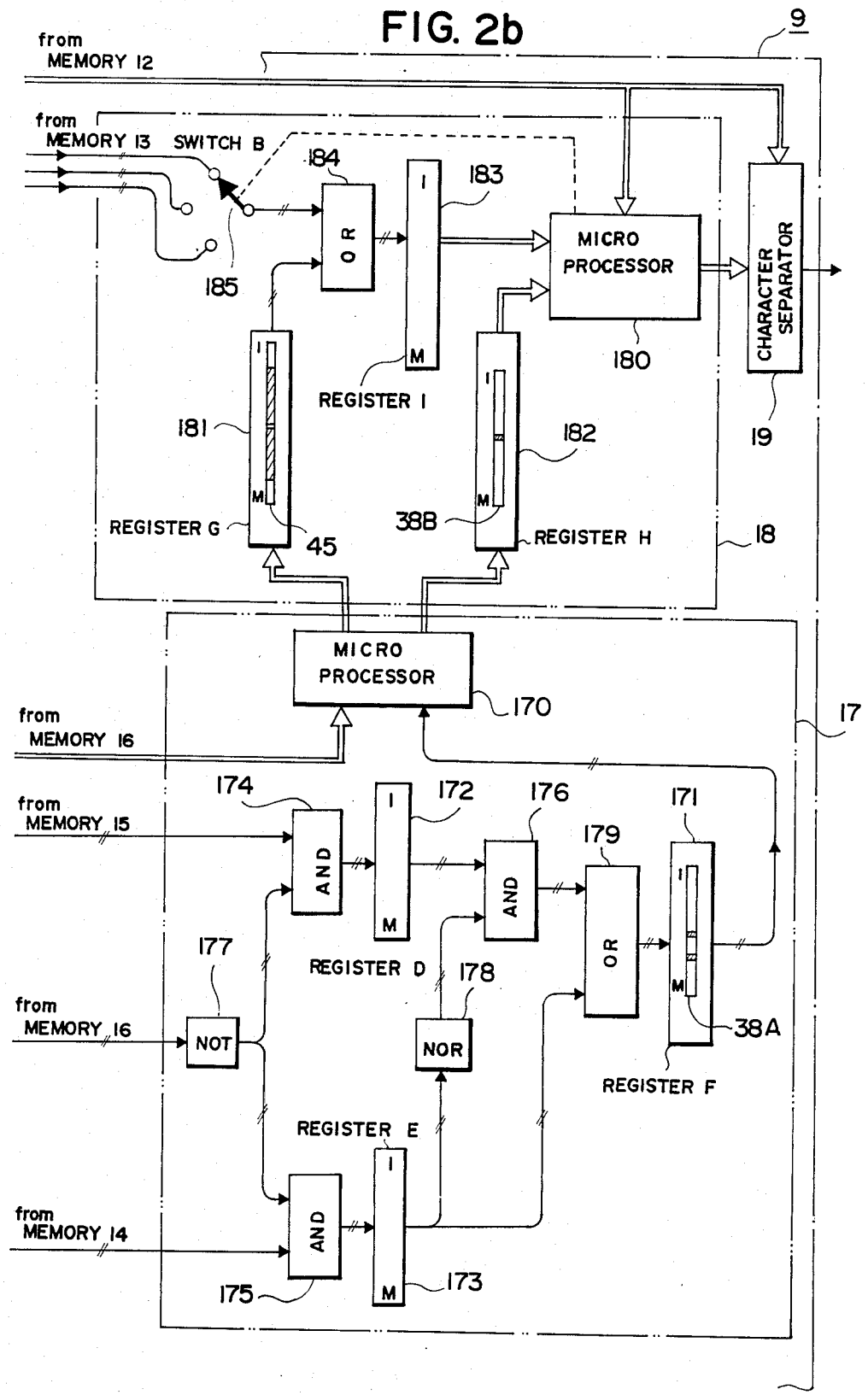

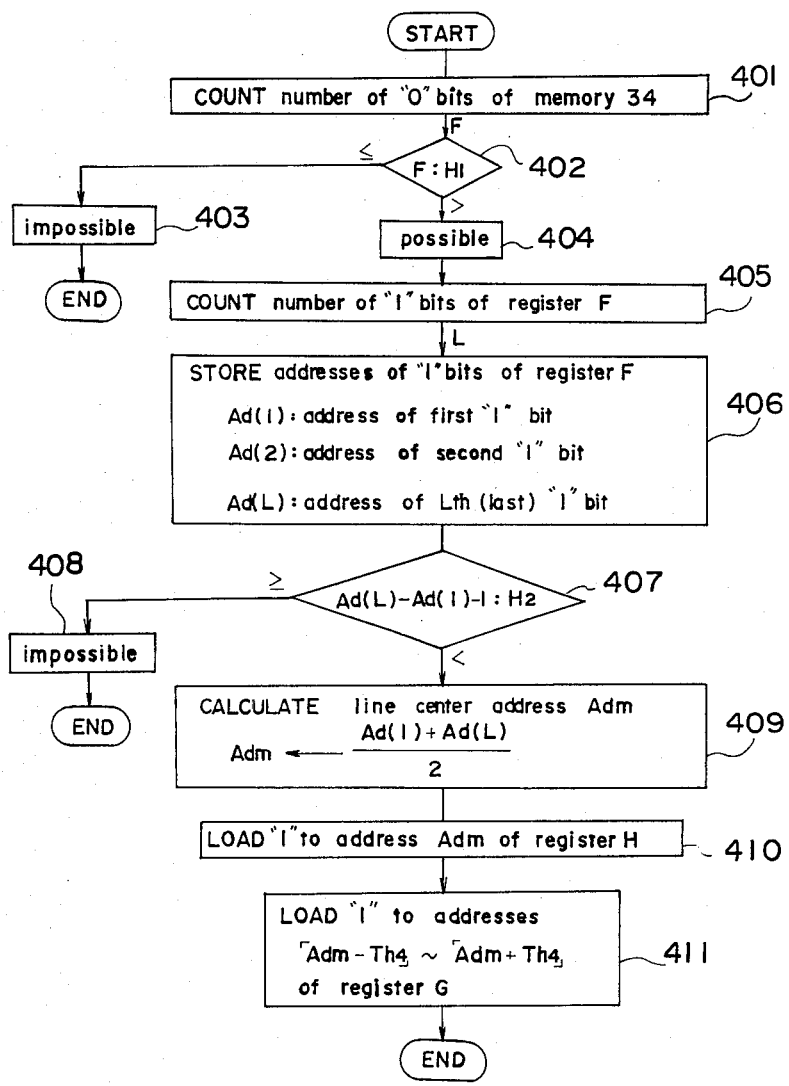

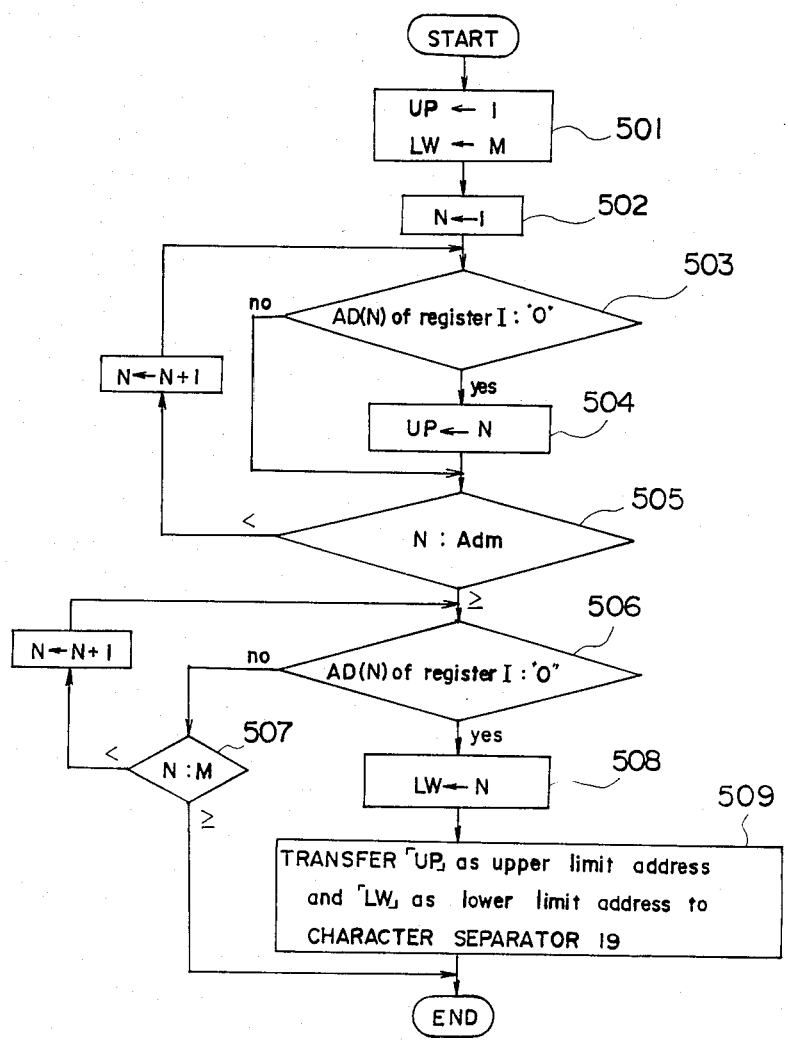

CHARACTER INFORMATION SEPARATING APPARATUS FOR PRINTED CHARACTER READING SYSTEMS

CROSS REFERENCE TO RELATED APPLICATIONS

This application is a continuation-in-part of U.S. Ser. No. 236,600 filed Feb. 20, 1981, now abandoned.

BACKGROUND OF THE INVENTION

1. Field of the Invention

This invention relates to character information separating apparatus for printed character reading systems. More particularly, the invention relates to improvements which ensure a highly accurate line-by-line separation of character information in the reading of the characters printed with a high line density or the characters printed with a closer line spacing on a source document.

2. Description of the Prior Art

With character readers known in the art, generally it has been the practice to read the characters on a source document, separate the thus read information line by line, successively dissect each of the lines into the individual characters from one end of the line and recognize each of the characters. As a result, it has been very important for each character to identify the line to which it belongs and thus it has been the practice with the conventional data sheets to leave a sufficient blank space between the lines. In other words, in accordance with the recommended standard character size I of the International Standard Organization (hereinafter simply referred to as an ISO) the character height is on the order of 2.8 mm and the usual practice is to print about three lines of characters per inch using for example a line spacing of about 5.7 mm. However, with the recent tendency toward extensive use of the character readers with various data processing systems, a need has arisen for increasing the line density and processing a large quantity of data in a short period of time so as to ensure the effective use of the character readers and a demand has begun to arise for increasing the line density up to about 6 lines/inch in the case of the previously mentioned size I.

However, if the line density is increased in this way, the characters of the adjacent two lines will tend to mingle with one another and even overlap one another in extreme cases, making it practically impossible for the conventional methods to effect the line-by-line separation of information and making the use of a character reader itself impossible. As a result, there is an absolute necessity for a printed character separating apparatus which is effective even in such a case.

A known line separating method which has been used widely will now be described. Firstly, the intended or object line is read and then the character information as a whole is projected in the line direction. The next step is to determine the center of the character area whose ends are surrounded by white background areas containing no character information and the separation of the intended line is accomplished on the basis of the thus determined center. In accordance with the previously mentioned recommended standard of the ISO, the tolerance for the vertical character misregistration (the vertical irregularity in the arrangements of the characters) is about $\frac{1}{4}$ of a character for the adjacent line characters and about $\frac{1}{2}$ of a character for the characters in the same line. As a result, if the density is as high as 6 lines/inch, there will be cases where the resulting linewise projection information contain no white background area and in such cases the line-by-line separation is of course impossible.

To overcome the foregoing deficiency, another method has been proposed in which the continuity of the white background conditions for the entire line is detected and used to accomplish the separation of the line. However, this known method tends to detect the continuous lines of the white background containing any lines other than the object line and result in a serious error. While this type of known method is effective in cases where the line spacing is considerably wide or the same type of characters such as numerals are in succession, the separation of lines is almost impossible in cases where the characters mingle with one another or any spaces or extraneous characters are included in the characters.

SUMMARY OF THE INVENTION

With a view to overcome the foregoing deficiencies in the prior art, it is a principal object of the invention to provide a character information separating apparatus for printed character reading systems which is capable of positively and easily performing the line-by-line separation even in cases where the line density is so high that the characters in the adjacent lines mingle with one another or even overlap one another partly.

It is another object of the invention to provide a character information separating apparatus which is relatively simple in construction and excellent in performance.

In accordance with one embodiment of the invention, an apparatus for separating character by character the character information obtained by reading groups of characters printed on a line in a predetermined size on a source document, comprises first means for storing the character information in an amount corresponding to a line width of approximately one and a half lines thereof, second means for dissecting linewise the information stored in the first means into a plurality of blocks each having a line length corresponding to two character spacings and for producing a linewise projection information for each of the dissected blocks, third means responsive to the projection information in the second means to produce center bit information indicative of a vertical center of a whole-line linewise projection information of characters having heights approximately equal to $\frac{1}{2}$ to 5/4 of a character of the predetermined size, fourth means responsive to the projection information in the second means to produce center bit information indicative of a vertical center of a whole-line linewise projection information of characters having heights approximately equal to the stroke width of $\frac{1}{2}$ of a character of the predetermined size, fifth means responsive to the projection information in the second means to produce a whole-line linewise projection information of the projection information of the preceding and following lines of an intended line, sixth means for combining the information in the third, fourth and fifth means to detect a line center position information of the intended line, and seventh means responsive to the information in the sixth means to perform line separation of the intended line from the information in the second means or the first means.

In accordance with the invention, even in cases where the characters printed on a document mingle with one another or even overlap one another in the adjacent lines, if all the characters are not in such condition at intervals of a two-character-spacing line length, the center line of the intended line can be positively and easily detected and hence all the characters excluding any extraordinary portions can be separated. As a result, except cases where the characters are printed erroneously (the characters overlap one another in the adjacent lines in practically all such cases), it is possible to accurately separate the individual characters even in cases where the characters of the previously mentioned ISO size I are printed with a high line density of 6 lines per inch.

When characters are printed on a paper, generally misregistration of the printed lines with respect to the paper occurs rather frequently and in such cases it is almost impossible for the known line separating methods to separate the individual characters. On the contrary, the invention is highly effective even in such cases so that if the line misregistration is less than a predetermined value (i.e., $H_2$ which will be described later), all the characters can be accurately separated by means of the previously mentioned separating operation. The invention is extremely effective in such cases where small letters, symbols, etc., of different heights are included in the lines.

In other words, by using the character separating apparatus according to the invention, it is possible to provide a character reading system which is relatively simple in construction and highly efficient such that it is possible to read any printed data of such high line density whose reading has heretofore been almost impossible for the conventional apparatus.

The above and other objects, construction and effects of this invention will become more apparent from the following description taken in conjunction with the accompanying drawings.

BRIEF DESCRIPTION OF THE DRAWINGS

FIG. 1 is a schematic diagram showing a character pattern on a memory plane which is useful for explaining the problems presented when a prior art line separating method is used with a data sheet having a higher printed line density.

FIG. 2 is a block diagram showing the construction of an apparatus according to an embodiment of this invention.

FIGS. 2(a) and 2(b) are block diagrams illustrating a detailed construction of the schematic of FIG. 2.

FIG. 3 is a schematic diagram showing an exemplary character pattern on the memory plane produced when a line information was read erroneously by the character detector 11 of FIG. 2.

FIG. 4 is a schematic diagram showing the information stored in the principal component memory means of FIG. 2 in the form of black and white patterns on the memory planes.

FIG. 5 is a schematic diagram of a black and white memory pattern which is useful for explaining the construction of the electrical window memory areas which are provided in the upper and lower limits detector 18 and necessary for the line separation of an intended line.

FIGS. 6(a), 6(b) and 6(c) are flow diagrams illustrating signal processing of the system of FIG. 2.

DESCRIPTION OF THE PREFERRED EMBODIMENTS

Figure 2A:
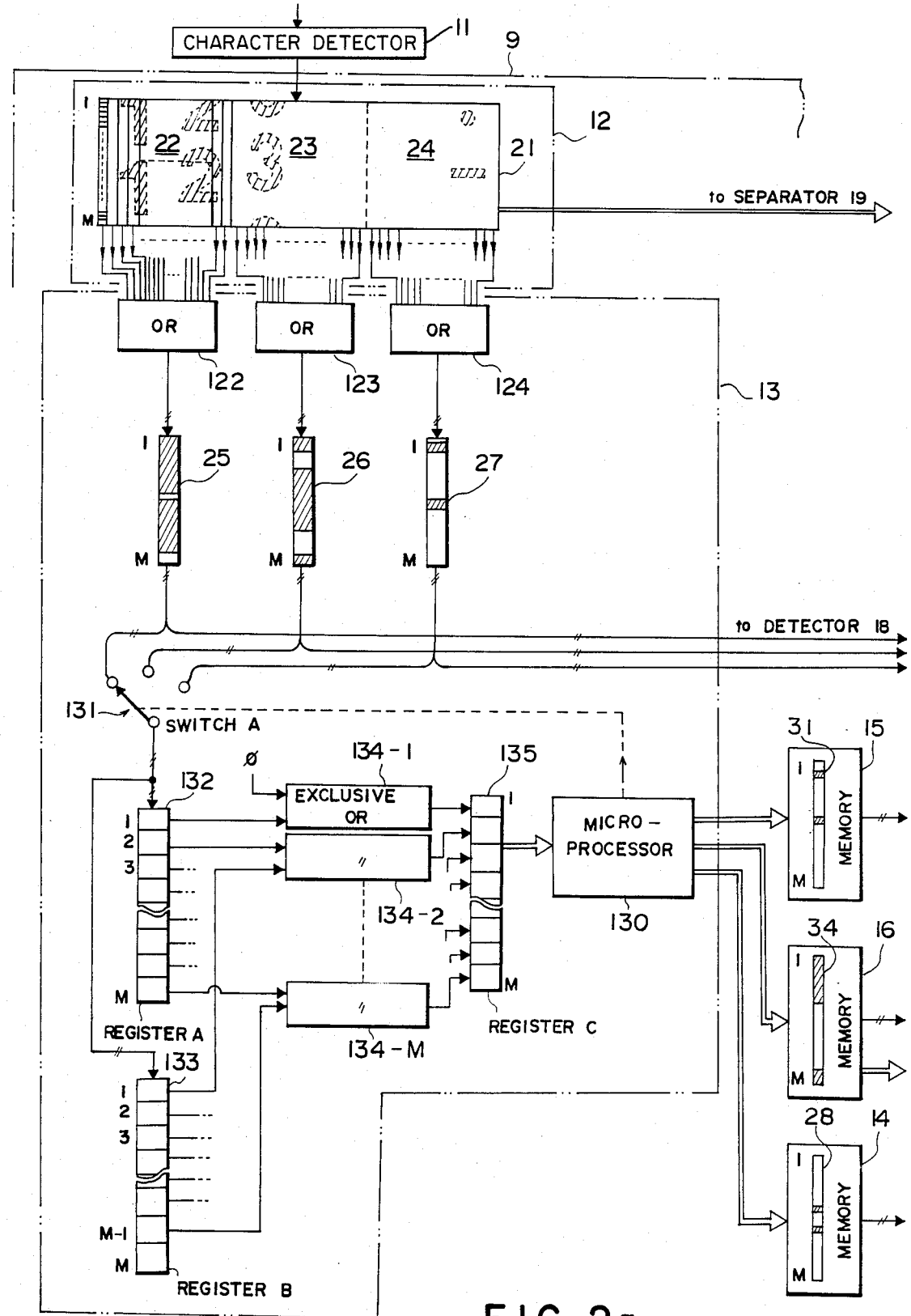

Referring to FIG. 1, in separating a line information, the read character information as a whole is projected linewise so as to produce an information 8 from which the center position of the character area of an intended line 2 is determined. In the case of the known method using the projection 8 of the intended line 2 in the line direction X, the projection 8 overlaps those of the preceding line 1 and the following line 3, with the result that it is not infrequent that the projection 8 contains no white background area making the detection of the line impossible. If continuity of the white background portion is detected with respect to the entire line in an attempt to overcome the above mentioned deficiency, where there are included a space 4 and a symbol 6 belonging to the preceding line 1 and a space 5 and a symbol 7 belonging to the intended line 2, three different continuous lines of the white background portion will be produced as shown by A, B and C in the Figure. This makes the selection of the separating line between the symbols 6 and 7 ambiguous and causes an erroneous separation.

This invention will now be described with reference to the illustrated embodiment. Referring first to FIG. 2, a character detector 11 is a device by which the characters printed on a data sheet 10 are read and converted into the corresponding binary coded electric signals and the resulting information is supplied to a printed character separating apparatus 9. The printed character separating apparatus 9 is one which separates the individual character information to which the invention is intended, so that from the character information supplied from the character detector 11, the individual character information are successively separated character by character and are then applied to the following character recognition unit 20. The character recognition unit 20 recognizes the characters printed on the data sheet 10 by means of the separated character information.

The printed character separating apparatus 9 mainly comprises a line information memory means 12, a 2-character-spacing projection group memory means 13, an ordinary character center bit information memory means 14, a small letter center bit information memory means 15, an adjacent line character projection information memory means 16, a line center detector 17, an upper and lower limits detector 18 and a character separating means 19. The line information memory means 12 mainly comprises a memory device 21 which, as shown in FIGS. 3 and 4, is in the form of a memory plane comprising a two-dimensional array of a large number of 1-bit unit memory elements for storing binary coded information (the unit memory elements are not shown) and it temporarily stores the binary coded character information supplied from the character detector 11. Thus, in the case of a data sheet on which the characters of the ISO size I are printed with the density of six lines per inch, the memory 21 is capable of storing the information with respect to the one and a half line width of each line.

In the event that the character information stored in the memory 21 is in the form shown in FIG. 3, the data sheet 10 can be slightly fed for correction in the column direction (Y) (the direction normal to the line or row direction (X)) so as to obtain an information similar to one shown in FIG. 4. It is necessary to perform this corrective feed only once for the data sheet being read and thereafter a character information of the similar condition as shown in FIG. 4 can be always stored by feeding the data sheet 10 line by line in the column direction. Thus, in the following description it is assumed that the condition shown in FIG. 4 is in effect maintained.

The 2-character-spacing projection group memory means 13 mainly comprises an array of a large number of projection memory blocks each comprising a one-dimensional array of a plurality of 1-bit unit memory elements. Thus, the information supplied from the line information memory means 12 is automatically dissected linewise into blocks each having a 2-character-spacing length and the linewise projections of the memory contents of the respective separated blocks are successively stored. In the case shown in FIG. 4, the information in the memory device 21 is dissected into a first block 22, a second block 23 and a third block 24 and the corresponding 2-character-spacing projection group memory section includes a first projection memory block 25, a second projection memory block 26 and a third projection memory block 27 which respectively store the information representing the linewise projections of the information contents of the respective blocks. For instance, the first projection memory block 25 stores successively from the above a black area a corresponding to the projection information of the preceding line 1, a white area b corresponding to the white background between the lines, a black area c corresponding to the intended line 2 and a white area d corresponding to the white background between the lines. While the following description will be made with reference to the case of this embodiment using the three blocks, the operating principle is all the same even if the number of blocks is increased.

The ordinary character center bit information memory means 14 mainly comprises a memory device 28 of the same one-dimensional memory type as previously mentioned so that of the projection information stored in the projection memory blocks 25, 26 and 27, only the center bits of the projection information whose upper and lower sides are enclosed by the white areas and having the heights of about that of the ordinary character (limited to those having heights of about ½ to 5/4 of a character) are detected, projected in the line direction and then stored. Thus, in the case of FIG. 4, a black area 30 represents the center bit information of the black area c in the first projection memory block 25 and a black area 29 represents the center bit information of the black area c in the second projection memory block 26. These center bit information are stored in the one-dimensional memory device.

The small letter center bit information memory means 15 also mainly comprises a one-dimensional memory device 31 and it is designed so that of the information stored in the respective projection memory blocks, only the center bits of the projection information of the small letters whose upper and lower sides are enclosed by the white areas (limited to those having heights corresponding to the range from about the character stroke width to ½ of a character) are projected linewise and stored as the intended information. Thus, in this case only the center bits of the black areas b and d in the third projection memory block 27 are respectively stored as black areas 32 and 33.

The adjacent line character projection information memory means 16 is designed so that of the projection information in the projection memory blocks, only the projection information of the preceding line 1 and the following line 3 are projected linewise and stored, and it mainly comprises a one-dimensional memory device 34 shown in FIG. 4. Of the projection information in the projection memory blocks, the projection information having the white area only on one side thereof are projected linewise to obtain the desired linewise projection information of those belonging to the preceding line 1 and the following line 3. In the case of FIG. 4, the projection of the black area a in the first projection memory block 25 and the black area a in the second projection memory block 26 results in a black area 35 and the projection of the black area e in the second projection memory block 26 also results in the storage of a black area 37.

The line center detector 17 is designed so that the line center bits of the intended line 2 are detected by means of the information in the ordinary character center bit information memory means 14, the small letter center bit information memory means 15 and the adjacent line character projection information memory means 16 and it mainly comprises a one-dimensionary memory device 38 (indicated by two conditions 38A and 38B in FIG. 4). As will be described later, in the case of FIG. 4 a center bit 41 in the white area of the condition 38A is detected as the line center bit of the intended line 2.

The upper and lower limits detector 18 mainly comprises a one-dimensional memory device 45 shown in FIG. 5, and it is designed so that the upper and lower limit positions of the respective 2-character-spacing lengths are detected from the respective block projection information supplied from the 2-character-spacing projection group memory means 13 in response to the line center bit information applied from the line center detector 17. In this case, if there is any portion (block) which does not allow the detection of upper and lower positions effected for the 2-character-spacing lengths, the character information of the line information memory means 12 corresponding to that block is utilized instead so as to detect the upper and lower positions for each of the characters.

The character separating means 19 is designed so that in response to the upper and lower position information of the intended line 2 applied from the upper and lower limits detector 18, the individual character information are separated from the line information stored in the line information memory means 12 and each of the separated character information is supplied to the character recognition unit 20.

With the apparatus constructed as described above, the character information detected from the data sheet 10 by the character detector 11 is first sorted two dimensionally in the memory device 21 of the line information memory means 12 as mentioned previously in such a form as shown in FIG. 4. This information is automatically dissected in the line direction (X) at intervals of a 2-character-spacing length and are separated into first, second and third blocks 22, 23 and 24. Then these block information are projected in the line direction and are then respectively stored in the first, second and third projection memory blocks 25, 26 and 27 of the 2-character-spacing projection group memory means 13 in the forms as shown in FIG. 4. The reason for dissecting the line information at intervals of a 2-character-spacing length resides in that the tolerance value for the vertical misregistration of adjacent line characters is selected considerably small as compared with the tolerance value for the entire line misregistration in accordance with the ISO recommended standards, etc., as mentioned previously.

As mentioned previously, the ordinary character center bit information memory means 14 checks only those projection information corresponding to the ordinary characters in the intended line and stored in the projection memory blocks 25, 26 and 27 and all the linewise projection information of the center bits alone are stored. In the like manner, the small letter center bit information memory means 15 checks only the projection information corresponding to the small letters in the intended line and produces and stores all the linewise projection information of the center bits alone. Consequently, the one-dimensional memory devices 28 and 31 store the information as shown in FIG. 4.

The adjacent line character projection information memory means 16 is designed so that the projection information of the preceding line 1 and the following line 3 stored in the projection memory blocks 25, 26 and 27, are again projected on the whole and stored. As a result, black areas 35 and 37 are stored in the one-dimensional memory device 34 of the memory means 16 as shown in the Figure. It should be noted here that of the projection information of the preceding and following lines stored in the projection memory blocks, those having heights of greater than 5/4 of a character are excluded. Such projection information having excessive heights and not belonging to the intended line correspond to the conditions where the characters of the adjacent lines are intermingled or brought into contact with one another when observed in terms of the 2-character-spacing lengths.

The line center detector 17 is such that the stored information of the adjacent line projection information memory means 16 is checked first so that if the height of the central white area 36 of the one-dimensional memory device 34 is less than a predetermined value $H_1$, it is determined that the line separation cannot be performed and the subsequent operation is interrupted. This is an indication that as mentioned previously, the degree of misregistration of the characters in the preceding line or the following line is considerably large or the reading of the characters is impossible due to the smears on the document or the like.

When the height of the white area 36 is greater than the value $H_1$, a command is applied to the ordinary character center bit information memory means 14 via the adjacent line character projection information memory means 16 and thus the center bit information contained within the white area 36 (the black areas 29 and 30 in the one-dimensional memory 38 in the illustrated case) are supplied to the line center detector 17. As a result, the black areas 39 and 40 are now projected onto the one-dimensional memory device 38 as shown by the condition 38A. The line center detector 17 checks the length l of the portion extending over the black areas 39 and 40 so that if the length l is less than the predetermined value $H_2$, it is determined that the line registration is normal and a line center bit 41 at the center of the length l is detected as the center position of the intended line. When the value of l is greater than the value $H_2$, it is determined that the line separation is impossible and thus the subsequent operation is interrupted. This condition is an indication that the vertical misregistration of the characters in the intended line is greater than a prescribed value.

When there is no center bit information in the one-dimensional memory device 28, the previously mentioned command is applied to the small letter center bit information memory means 15 via the adjacent line character projection information memory means 16 so that the center bit information contained in the area defined by the white area 36 of the one-dimensional memory device 34, that is, in the illustrated case only the information of the black area 33 of the one-dimensional memory device 31 is applied to the one-dimensional memory device 38 of the line center detector 17 (in this case the condition 38B results). As a result, the corresponding black area 42 is projected onto the one-dimensional memory device 38 and this black area is the desired line center bit of the intended line. In the described detection of line center bit, the information of the ordinary characters are checked first because such information contain a greater amount of accurate line center bit information.

The one-dimensional memory device 45 of the upper and lower limits detector, 18 includes mask bit areas 44A and 44B of a height corresponding to about ⅔ of a character on both sides of its center bit 46 and white area checking window bit areas 43A and 43B of a height corresponding to about ¼ of a character on the outside of the areas 44A and 44B as shown in FIG. 5. The position of the center bit 46 is electrically aligned with the line center bit position detected by the line center detector 17 and then the projection information positions in the projection memory blocks 25, 26 and 27 of the 2-character-spacing projection group memory means 13 corresponding to the window bit areas 43A and 43B are electrically scanned, thereby checking the presence of white background in these portions. The scanning is effected in the directions indicated by the arrows in FIG. 5 so that the positions at which the white background is first detected are considered as the upper and lower limit positions of the blocks 22, 23 and 24, respectively. This operation is performed for each of the projection memory blocks and the detection of the upper and lower limit positions over the entire line of the intended line 2 or the line separation of the intended line 2 is completed.

In this case, as mentioned previously, the information in the respective blocks of the line information memory means 12 are used as such for any projection memory block with which no upper or lower side white background was detected and then the line separation is performed on the portions with which the white background was detected. Of course, the line separation is not effected on the portion with which no white background is detected. Such portion is one where the characters of the adjacent lines are overlapping or the data sheet itself is smeared. In this way, all the portions permitting the line separation are separated.

The character separating means 19 is responsive to the upper and lower limit position information supplied from the upper and lower limits detector 18 so as to separate the individual character information from the line information stored in the line information memory means 12. In this case, the usually used separating method consists of detecting the white background area between the characters in the line and separating the character information in such a manner that the length of each character area substantially attains a predetermined value. Each of the separated character information is supplied to the following character recognition unit 20 which in turn recognizes the input character. Many different types of recognition methods are known in the art and thus no description of the lower limit positions over the entire line of the intended line 2 or the line separation of the intended line 2 is completed.

In this case, as mentioned previously, the information in the respective blocks of the line information memory means 12 are used as such for any projection memory block with which no upper or lower side white background was detected and then the line separation is performed on the portions with which the white background was detected. Of course, the line separation is not effected on the portion with which no white background is detected. Such portion is one where the characters of the adjacent lines are overlapping or the data sheet itself is smeared. In this way, all the portions permitting the line separation are separated.

FIGS. 2a and 2b are block diagram illustrating detailed construction of the apparatus 9 shown schematically in FIG. 2. In FIG. 2a, the character detector 11 and plurality of memory means 12, 13, 14, 15 and 16 in FIG. 2 are shown, meanwhile, the line center detector 17, the upper and lower limits detector 18 and the character separator 19 are shown in FIG. 2b.

For the write/read operation of memory means 12, 13, 14, 15 and 16, conventional memory control unit, which is not shown in FIG. 2a, may be provided.

The digitized character information from the character detector 11 is stored in the memory device 21 of the memory means 12 as shown in FIG. 2a. The memory device 21 is constructed by arranging in the line direction (x) a plurality of one-dimensional memory array each comprising M-bits unit memory elements in the column direction (Y). Said plurality of one-dimensional memory array is dissected linewise into three (3) blocks 22, 23 and 24 each having a width of 2-character-spacing length, and the memory contents of respective blocks are successively stored as linewise projection informations into the projection memories 25, 26 and 27 through one of OR-CIRCUITS 122, 123 and 124 respectively. These projection memories 25, 26 and 27 are also comprised of M-bits linear array memory respectively.

Figure 6A:
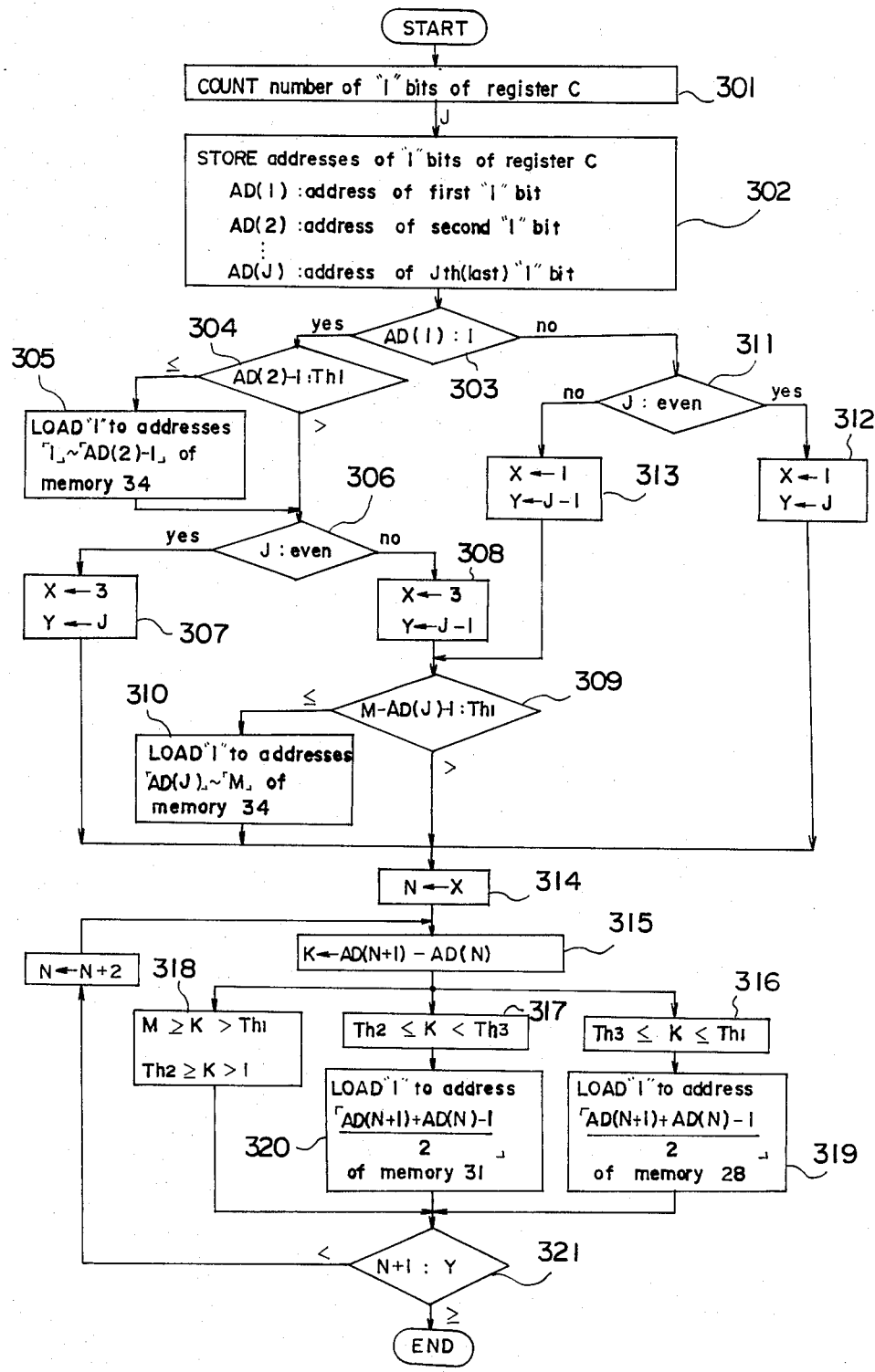

The projection informations of respective blocks in the projection memories 25, 26 and 27 are now read out one by one by the microprocessor 130 provided in the projection group memory means 13 and are stored as specific informations in three (3) memory means 14, 15 and 16 in accordance with the flow chart shown in FIG. 6a.

FIG. 6a illustrates flow of signal processing by means of the processor 130. Also in this flow chart, bit information for the black area is shown with "1" and that for the white area with "0".

After the writing operation of all the information from the respective blocks into all of the projection memories 25, 26 and 27 is finished, processor 130, at first, selects memory 25 by means of switch A (131) thereby stored content of the memory 25, that is, projection information of first block 22 is written into the M-bits register A (132) and M-bits register B (133) respectively. Each bit data of respective registers A and B are collated their dissimilarity between adjacent bits ("1" or "0") by means of M-pieces of exclusive OR circuits 134-1, 134-2 ... 134-M, and data "0" (in case of adjacent bits being same contents) or "1" (in case of adjacent bits being different contents) is written into the corresponding bit of the M-bits register C from each exclusive OR circuit. As a result of the writing "1" or "0" into the register C, a position corresponding to the boundary between black area and white area (a,b,c,d of FIG. 4) of the projection information of memory 25 can be detected as an address of bits having data "1" among bits of said register C. Just after the writing into register C, processor 130 starts execution of the program shown in FIG. 6a, and at first counts number of "1" bits of the stored contents of register C by means of step 301. Let this count value be [J], each address of "1" bits are stored in the inner memory (not shown) of the processor 130 by means of step 302, let the address of first "1" bit be $\ulcorner AD(1)\lrcorner$, that of second "1" bit $\ulcorner AD(2)\lrcorner$, and so forth, and that of last "1" bit $\ulcorner AD(J)\lrcorner$; processor 130 checks if $\ulcorner AD(1)\lrcorner$ is 1 or not (i.e, head of the addresses is 1 or not) by means of step 303. In the case of $\ulcorner AD(1)\lrcorner = 1$, head address is in "black" condition such as memories 25 and 26 shown in FIG. 4. In the case of $\ulcorner AD(1)\lrcorner \neq 1$, it is the case that the head address is "white" condition such as memory 27 shown in FIG. 4. In the case of AD(1) = 1, [AD(2)−1] is compared with a predetermined threshold value Th1 at the next step 304. Th1 has a value corresponding to the value of 5/4 heights of a character. Only in the case when the [AD(2)−1] value is below the value of Th1, addresses from 1 to $\ulcorner AD(2)-1\lrcorner$ of the memory device 34 of the memory 16 (adjacent line character projection information memory) are entirely loaded "1" to make black area at the step 305. In the case of [AD(2)−1]≦Th1, after the loading of "1" into said memory device 34, and in the case of [AD(2)−1]>Th1, leaving as it is, directly advance to the next step 306 and the judgement of count value [J] of even or odd is made. When [J] is even, inner registers X and Y (not shown) in the processor 130 are loaded X=3 and Y=J respectively at step 307, and the step is advanced to step 314. When J is odd, said registers X and Y are loaded X=3 and Y=J −1 at step 308, and the step is advanced to step 309. At the step 309, [M-AD(J)−1] is compared with the threshold value Th1. When [M-AD(J)−1]>Th1, step is advanced directly to step 314, and when [M-AD(J)−1]≦Th1, step is also advanced to the step 314 after loaded "1" to all of the addresses from $\ulcorner AD(J)\lrcorner$ to $\ulcorner M\lrcorner$ of the memory device 34 to make them black areas. The example shown in FIG. 2a, at the memory 25 [J] becomes even and at the memory 26 [J] becomes odd.

Similar check operation about [J] is carried out at step 311 when the result $\ulcorner AD(1)\lrcorner \neq 1$ is obtained at step 303, and in the case of memory 27 shown in the figure for example, because [J] is even, process advances to step 312, and after loaded X=1, Y=J to said inner registers X and Y respectively, process advances to step 314. In the case when [J] is judged odd, process advances to step 313, and by loading X=1 and Y=J−1 to said registers X and Y respectively, then process advances to step 309, and then directly or through step 310, process advances to step 314.

After the step 314, processor 130 stores data into ordinary character center bit information memory 14 and small letter center bit information memory 15. In other words, in the step 314, the contents of the register X is loaded to another inner register N (not shown), and at step 315, K=[AD(N+1)−AD(N)] is calculated from the address $\ulcorner AD(N)\lrcorner$ and $\ulcorner AD(N+1)\lrcorner$ in the register N, and after the calculation, calculated result K is judged at the following three (3) steps 316, 317 and 318, then the process advances to step 321. Step 316 is the case that K is a value between ½ and 5/4 heights of a character and Th3 is a threshold value equivalent to ½ height of a character, and in this case "1" is loaded in the address $\ulcorner [AD(N+1)+AD(N)-1]/2 \lrcorner$ of memory device 28 at the step 319. Step 317 is the case that K is a value between character stroke width and ½ heights of a character and Th2 is a threshold value equivalent to the character stroke width, and in this case "1" is loaded to an address ⌈AD(N+1)+AD(N)−1⌋/2⌋ of memory device 31 at step 320. In these cases, "1" loaded into memory 28 at step 319 is for example the black area 29 or 30 shown in FIG. 4 and "1" loaded into memory 31 at step 320 is the black area 32 or 33.

Step 318 is the case that K is a value between Th1 and M or between 1 and Th2, and in those cases, process directly advances to step 321 and in this step 321, contents in the register Y are compared with N+1. In the case when N+1<Y, N is incremented to N+2 and repetition of the same steps from step 315 is carried out and when the result of N+1≧Y is obtained, program is brought to an end.

The processor 130 carries out aforesaid program flow for the memories 25, 26 and 27 by means of switch over of switch A(131) and necessary informations are stored in the main memory means 14, 15 and 16 respectively.

Further, as shown in FIG. 2b, line center detector 17 includes M-bits register F(171) as a memory device 38A showing FIG. 4, another M-bits registers D(172) and E(173), microprocessor 170 to execute writing of the data to these registers, AND circuits 174, 175 and 176, NOT circuit 177, NOR circuit 178 and OR circuit 179. Program flow of the processor 170 is shown in FIG. 6b. At the first step of 401, number of "0" bits (i.e. "white") in the memory device 34 is counted and the counted value F is compared with aforesaid value H₁ at step 402. In the case when F≦H₁, judgement that "the line separation is impossible" is made at step 403 and program is brought to an end. Only in the case when F>H₁, judgement is made that "the line separation is possible" at step 404 and advances the step to the next step 405, and at the step 405, number of "1" bits in the register F(171) is counted. This counted value is shown as [L] in FIG. 6b.

Here, stored contents of register F(171) is somewhat explained as follows:

At first, contents of the memory device 34 are inverted by means of NOT circuit 177, then they are introduced into AND circuits 174 and 175, then logical "AND" is made with the contents of the memory device 31 and the result is written in the register D(172), and also at the other AND circuit logical "AND" is made with the contents of the memory device 28 and the result is also written into the register E(173). Contents in the register E(173) are introduced into AND circuit 176 through NOR circuit 178 and also introduced directly into OR circuit 179. Logical "AND" between contents in the register D(172) and the processed contents of the register E(173) by means of aforesaid NOR circuit 178 are produced in the AND circuit 176 and the results thereof are introduced into OR circuit 179. Thus, contents about condition shown by the reference numeral 38A in FIG. 4 are obtained in the register F(171) storing the output of OR circuit 179.

After the count value [L] is obtained at step 405, program is advanced to step 406, and addresses of "1" bits of the contents of register F(171) are stored to the inner memory (not shown) of the processor 170. Addresses of "1" bits have L places and they be indicated as ⌈Ad(1)⌋ for the first address, ⌈Ad(2)⌋ for the second address, and so force to Ad(L) for the last one. In the next step 407, [Ad(L)−Ad(1)−1] value is compared with aforesaid H₂ value and when former value exceed the latter, it is judged in the step 408 that "the line separation is impossible" and the program is brought to an end. On the other hand when the value of [Ad(L)−Ad(1)−1] is less than that of H₂, process is advanced to step 409 and the address of the line center bit ⌈Adm⌋ is calculated from the formula shown below:

$$Adm = [Ad(1) + Ad(L)]/2$$

Then at the step 410 "1" is loaded to the address ⌈Adm⌋ of register H(182) in the upper and lower limits detector 18, and after that, at the step 411, "1" is loaded to the address ⌈Adm−Th4⌋ to ⌈Adm+Th4⌋ of another register G(181) in the detector 18. Th4 is a preset constant corresponding to ⅜ height of a character.

Aforesaid detector 18 includes said register H(182) as a memory of condition 38B in FIG. 4, said register G(181) as a mask memory 45 in FIG. 5, another register I(183), OR circuit 184, switch B(185) to select said memories 25, 26 and 27 and microprocessor 180. Processor 180 executes program flow shown in FIG. 6c for each of the memories 25, 26 and 27 by selecting one of them by switching over switch B(185) sequentially. In this case, logical "inclusive OR" of contents in the selected memory (25, 26 or 27) and contents of mask register G(181) is stored in the register I(183).

Now, at the step 501 [1] and [M] are loaded to inner register UP and another inner register LW (both not shown) respectively by the processor 180. [1] is set to inner counter N at step 502, and at step 503, address ⌈AD(N)⌋ is checked in turn from N=1 to detect "0" or not. When detected value is not "0", value of counter N at that instant is compared with ⌈Adm⌋ stored in the register H(182) at step 505, and if N<Adm, N is incremented to N+1 and process is repeated from step 503. When ⌈AD(N)⌋ is "0" at step 503, address ⌈AD(N)⌋ of that instant is took into register UP. In such a manner step 503 to 505 are repeated by incrementing N and when the result N=Adm is obtained, step is advanced from 505 to 506 and at this time register UP holds uppermost address value AD(UP) of "0" bit which is nearest to the center among address ⌈1⌋ and center address ⌈Adm⌋ of register I(183).

At the step 506, address having content "0" is detected from the addresses between center address ⌈Adm⌋ and last address ⌈M⌋. When ⌈AD(N)⌋ is not "0", N is compared with M in the step 507, and when N<M, N is incremented to N+1 and the steps is repeated from step 506. When ⌈AD(N)⌋ arrives to "0", at the step 508 address AD(N) of that instance is taken into register LW. This address is the first "0" address found by scanning from the center address ⌈Adm⌋ to the last address ⌈M⌋ in the register I(183), and this address is held in the register LW as a lower limit address value ⌈AD(LW)⌋. At the step 509, these upper and lower limit values are transferred to the character separator 19 and after that, program is brought to an end when N≧M is obtained at step 507.

In these manner, the upper and lower limit position information is sent to separator 19 for the line separation per each two character-spacing-length by means of the switchover of switch B(185) for each of the memory 25, 26 and 27.

The character separating means 19 is responsive to the upper and lower limit position information supplied from the upper and lower limits detector 18 so as to separate the individual character information from the line information stored in the line information memory means 12. In this case, the usually used separating method consists of detecting the white background area between the characters in the line and separating the character information in such a manner that the length of each character area substantially attains a predetermined value. Each of the separated character information is supplied to the following character recognition unit 20 which in turn recognizes the input character. Many different types of recognition methods are known in the art and thus no description of the recognition operation will be made here.

It will thus be seen from the foregoing description that in accordance with the invention the 2-character-spacing projection group memory means 13 dissects the input line information into blocks each having a 2-character-spacing length so that a linewise projection is produced for each of the blocks and the resulting projections are utilized by the line center detector 17 to detect the center bits of the intended line. As will be seen from the previously mentioned ISO recommended standards, the limitation to the vertical misregistration between the characters in the adjacent lines is considerably smaller than that to the vertial displacement of the entire line and consequently even the use of the linewise projection information of the 2-character-spacing length ensures accurate detection of the line center bit 41 or 42. Further, since each of the memories other than the memory device 21 comprises a one-dimensional memory device, the printed character separating apparatus 9 is not especially high in cost. In other words, the use of the projection information separated at intervals of a 2-character-spacing length results in a character separating apparatus which is relatively simple in construction and excellent in performance.

In accordance with the invention, since all the 2-character-spacing projection information of the preceding and following line characters which are greater than 5/4 of a character are excluded by the adjacent line character projection information memory means 16, even if the characters of the adjacent lines overlap those of the intended line, their projection information are excluded altogether. And the line center bits of the other portions are detected by the line center detector 17 and the separation of the individual characters can be effected easily even in such cases. Further, by virtue of the fact that if there is any portion whose upper and lower limit positions cannot be detected by means of the information from the 2-character-spacing projection group memory means 13, the upper and lower limits detector 18 directly utilizes the information from the line information memory means 12 to detect the upper and lower limit positions of that portion, those portions where there are overlapping characters of the adjacent lines or the smeared areas are all excluded and all the characters are separated. Further, since the line center detector 17 first performs the detection of line center bit position of the ordinary characters and since the line center bit position of the small letters is used only in the absence of any ordinary character line center bit position, even if any spaces or small letters are included in the intended line, the center bit positions of the line on the whole can be accurately detected and the desired separation of the intended line can be accomplished without any irregularity.

What is claimed is:

1. In an apparatus wherein character information obtained by reading groups of characters printed on a line and having a predetermined size and a character stroke width, said characters read from a source document are thereafter separated character by character prior to a recognition process, the improvement comprising:

first means for storing said character information in an amount corresponding to the width of approximately one and a half lines on the document;

second means for dissecting linewise the information stored in said first means into a plurality of blocks each having a line length corresponding to two character spacings and for producing a linewise projection information for each of said dissected blocks;

third means responsive to the projection information in said second means to produce a center bit information indicative of the vertical center of the linewise projection information of each character having a height approximately equal to ½ to 5/4 of a character of said predetermined size;

fourth means responsive to the projection information in said second means to produce a center bit information indicative of a vertical center of the linewise projection information of each character having a height approximately equal to the predetermined character stroke width to ½ of a character of said predetermined size;

fifth means responsive to the projection information in said second means to produce the linewise projection information of the projection information of preceding and following lines of an intended line;

sixth means for combining the information in said third, fourth and fifth means to detect a line center position information of said intended line; and seventh means responsive to the information in said sixth means to perform line separation of said intended line from the information in said second means or said first means.

2. An apparatus according to claim 1, further comprising means whereby the line information separated by said seventh means is separated character by character into individual character information.

3. An apparatus according to claim 1, wherein said first means comprises a two-dimensional memory including unit memory elements arranged in a two-dimensional array, wherein said second means comprises a plurality of one-dimensional memory blocks each including unit memory elements arranged in a one-dimensional array, and wherein each of said third, fourth, fifth, sixth and seventh means comprises another one-dimensional memory.

4. An apparatus according to claim 1, wherein said fifth means is such that when producing the projection information of the preceding and following lines from the information in said second means, those projection information having heights greater than 5/4 of a character are excluded.

5. An apparatus according to claim 1, wherein said sixth means is such that the information in said fifth means is checked so that when the height of the area between the whole-line linewise projection of the preceding line projection information and the whole-line linewise projection of the following line projection information is greater than a predetermined value, the center bit information within said area are received from said third means and said fourth means in this order and the center position of said intended line is detected in accordance with said received center bit information.

6. An apparatus according to claim 1, wherein said seventh means comprises one-dimensional memory means including a center bit, a mask bit area provided on each of the upper and lower sides of said center bit and having a height approximately equal to $\frac{5}{8}$ of a character and a window bit area provided on the outer side of each of said mask bit areas and having a height approximately equal to $\frac{1}{4}$ of a character, and wherein said center bit is electrically aligned with the line center position detected by said sixth means, whereby the projection information in each of the blocks of said second means is scanned upwardly and downwardly from said center bit area to detect upper and lower limit positions of each said block in accordance with a bit position at which a white background area is first detected in a portion corresponding to each of said window bit areas, and then with respect to any of said blocks for which the detection of white background area in said upper and lower window bit areas is not possible, the corresponding character information of said first means are similarly scanned so as to detect upper and lower limit positions of said any block.

* * * * *